(12) United States Patent
Brooks et al.

(10) Patent No.: US 7,373,489 B1
(45) Date of Patent: May 13, 2008

(54) APPARATUS AND METHOD FOR FLOATING-POINT EXCEPTION PREDICTION AND RECOVERY

(75) Inventors: Jeffrey S. Brooks, Austin, TX (US); Paul J. Jordan, Austin, TX (US); Rabin A. Sugumar, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 527 days.

(21) Appl. No.: 10/880,713

(22) Filed: Jun. 30, 2004

(51) Int. Cl.
G06F 9/00 (2006.01)
G06F 7/38 (2006.01)
G06F 9/44 (2006.01)

(52) U.S. Cl. ............... 712/244; 708/498; 708/495; 712/222

(58) Field of Classification Search ......... 712/244, 712/222; 708/498, 495
See application file for complete search history.

(56) References Cited

U.S. PATENT DOCUMENTS

| | | | |
|---|---|---|---|
| 4,845,659 A * | 7/1989 | Hrusecky .......... | 712/222 |
| 4,879,676 A * | 11/1989 | Hansen ............. | 708/505 |
| 5,046,068 A | 9/1991 | Kubo et al. | |
| 5,193,158 A * | 3/1993 | Kinney et al. ....... | 712/244 |
| 5,257,215 A | 10/1993 | Poon | |
| 5,339,266 A | 8/1994 | Hinds et al. | |
| 5,386,375 A | 1/1995 | Smith | |
| 5,488,729 A | 1/1996 | Vegesna et al. | |
| 5,515,308 A | 5/1996 | Karp et al. | |
| 5,546,593 A | 8/1996 | Kimura et al. | |
| 5,548,545 A * | 8/1996 | Brashears et al. ..... | 708/495 |
| 5,559,977 A * | 9/1996 | Avnon et al. ........ | 712/244 |
| 5,619,439 A | 4/1997 | Yu et al. | |
| 5,812,439 A * | 9/1998 | Hansen ............. | 708/497 |
| 5,867,724 A * | 2/1999 | McMahon ........... | 712/22 |
| 5,954,789 A | 9/1999 | Yu et al. | |
| 6,076,157 A | 6/2000 | Borkenhagen et al. | |
| 6,088,788 A | 7/2000 | Borkenhagen et al. | |
| 6,088,800 A | 7/2000 | Jones et al. | |

(Continued)

OTHER PUBLICATIONS

Tulsen et al., "Power-sensitive multithreaded architecture," IEEE 2000, pp. 199-206.

(Continued)

Primary Examiner—Eddie Chan
Assistant Examiner—Idriss Alrobaye
(74) Attorney, Agent, or Firm—Robert C. Kowert; Anthony M. Petro; Meyertons, Hood, Kivlin, Kowert & Goetzel, P.C.

(57) ABSTRACT

An apparatus and method for floating point exception prediction and recovery. In one embodiment, a processor may include instruction fetch logic configured to issue a first instruction from one of a plurality of threads and to successively issue a second instruction from another one of the plurality of threads. The processor may also include floating-point arithmetic logic configured to execute a floating-point instruction issued by the instruction fetch logic from a given one of the plurality of threads, and further configured to determine whether the floating-point instruction generates an exception, and may further include exception prediction logic configured to predict whether the floating-point instruction will generate the exception, where the prediction occurs before the floating-point arithmetic logic determines whether the floating-point instruction generates the exception.

24 Claims, 8 Drawing Sheets

U.S. PATENT DOCUMENTS

| | | | |
|---|---|---|---|
| 6,105,127 A | 8/2000 | Kimura et al. | |
| 6,131,104 A | 10/2000 | Oberman | |
| 6,212,544 B1 | 4/2001 | Borkenhagen et al. | |
| 6,219,778 B1 * | 4/2001 | Panwar et al. | 712/23 |
| 6,243,788 B1 | 6/2001 | Franke et al. | |
| 6,282,554 B1 | 8/2001 | Abdallah et al. | |
| 6,317,840 B1 | 11/2001 | Dean et al. | |
| 6,341,347 B1 | 1/2002 | Joy et al. | |
| 6,349,319 B1 | 2/2002 | Shankar et al. | |
| 6,357,016 B1 | 3/2002 | Rodgers et al. | |
| 6,397,239 B2 | 5/2002 | Oberman et al. | |
| 6,415,308 B1 | 7/2002 | Dhablania et al. | |
| 6,427,196 B1 | 7/2002 | Adiletta et al. | |
| 6,434,699 B1 | 8/2002 | Jones et al. | |
| 6,460,134 B1 * | 10/2002 | Blomgren et al. | 712/219 |
| 6,470,443 B1 * | 10/2002 | Emer et al. | 712/205 |
| 6,496,925 B1 | 12/2002 | Rodgers et al. | |
| 6,507,862 B1 | 1/2003 | Joy et al. | |
| 6,523,050 B1 | 2/2003 | Dhablania et al. | |
| 6,564,328 B1 | 5/2003 | Grochowski et al. | |
| 6,567,839 B1 | 5/2003 | Borkenhagen et al. | |
| 6,594,681 B1 | 7/2003 | Prabhu | |
| 6,625,654 B1 | 9/2003 | Wolrich et al. | |
| 6,629,236 B1 | 9/2003 | Aipperspach et al. | |
| 6,629,237 B2 | 9/2003 | Wolrich et al. | |
| 6,631,392 B1 * | 10/2003 | Jiang et al. | 708/498 |
| 6,633,895 B1 * | 10/2003 | Bass et al. | 708/498 |
| 6,651,158 B2 | 11/2003 | Burns et al. | |
| 6,668,308 B2 | 12/2003 | Barroso et al. | |
| 6,668,317 B1 | 12/2003 | Bernstein et al. | |
| 6,671,827 B2 | 12/2003 | Guilford et al. | |
| 6,681,345 B1 | 1/2004 | Storino et al. | |
| 6,687,838 B2 | 2/2004 | Orenstien et al. | |
| 6,694,347 B2 | 2/2004 | Joy et al. | |
| 6,694,425 B1 | 2/2004 | Eickemeyer | |
| 6,697,935 B1 | 2/2004 | Borkenhagen et al. | |
| 6,728,845 B2 | 4/2004 | Adiletta et al. | |
| 6,748,556 B1 | 6/2004 | Storino et al. | |
| 6,789,098 B1 * | 9/2004 | Dijkstra | 708/495 |
| 6,801,997 B2 | 10/2004 | Joy et al. | |
| 6,820,107 B1 | 11/2004 | Kawai et al. | |
| 6,847,985 B1 | 1/2005 | Gupta et al. | |
| 6,857,064 B2 | 2/2005 | Smith et al. | |
| 6,883,107 B2 | 4/2005 | Rodgers et al. | |
| 6,889,319 B1 | 5/2005 | Rodgers et al. | |
| 6,898,694 B2 | 5/2005 | Kottapalli et al. | |
| 6,996,596 B1 * | 2/2006 | Ho et al. | 708/495 |
| 7,143,412 B2 | 11/2006 | Koenen | |
| 2002/0194455 A1 * | 12/2002 | Gold et al. | 712/217 |
| 2003/0028759 A1 * | 2/2003 | Prabhu et al. | 712/244 |
| 2004/0059769 A1 * | 3/2004 | Cornea-Hasegan | 708/498 |

OTHER PUBLICATIONS

Uhrig et al., "Hardware-based power management for real-time applications," Proceedings of the Second International Symposium on Parallel and Distributed Computing, IEEE 2003, 8 pages.

Tullsen, et al., "Simultaneous Multithreading: Maximizing On-Chip Parallelism," ISCA 1995, pp. 533-544.

Tullsen, et al., "Exploiting Choice: Instruction Fetch and Issue on an Implementable Simultaneous Multithreading Processor," pp. 191-202.

Smith, "The End of Architecture," May 29, 1990, pp. 10-17.

Alverson et al., "Tera Hardware-Software Cooperation," 16 pages.

Ungerer et al., "A Survey of Processors with Explicit Multithreading," ACM Computing Surveys, vol. 35, No. 1, Mar. 2003, pp. 29-63.

Alverson et al., "The Tera Computer System," ACM 1990, 6 pages.

Alverson et al., "Exploiting Heterogenous Parallelism on a Multithreaded Multiprocessor," ACM 1992, pp. 188-197.

Uhrig, et al., "Implementing Real-Time Scheduling Within A Multithreaded Java Microcontroller," 8 pages.

Ide, et al., "A 320-MFLOPS CMOS Floating-Point Processing Unit for Superscalar Processors," IEEE 1993, 5 pages.

Nemawarkar, et al., "Latency Tolerance: A Metric for Performance Analysis of Multithreaded Architectures," IEEE 1997, pp. 227-232.

Baniasadi, et al., "Instruction Flow-Based Front-end Throttling for Power-Aware High Performance Processors," ACM 2001, pp. 16-21.

Gura, et al., "An End-to-End Systems Approach to Elliptic Curve Cryptography," 16 pages.

Eberle, et al., "Cryptographic Processor for Arbitrary Elliptic Curves over $GF(2^m)$," 11 pages.

Kalla, et al., IBM Power5 Chip: A Dual-Core Multithreaded Processor, IEEE MICRO, vol. 24, No. 2, Apr. 2004, pp. 40-47.

Sun Microsystems, "MAJC Architecture Tutorial. White Paper," Sep. 1999, pp. 1-31.

Sun Microsystems, "Introduction to Throughput Computing," Feb. 2003, pp. 1-18.

Kongetira, et al., "Niagara: A 32-Way Multithreaded Sparc Processor," IEEE Micro, vol. 25, No. 2, Apr. 2005, pp. 21-29.

U.S. Appl. No. 10/881,763, filed Jun. 30, 2004.

U.S. Appl. No. 10/880,488, filed Jun. 30, 2004.

Standards Committee of the IEEE Computer Society, "An American National Standard IEEE Standard for Binary Floating-Point Arithmetic," 1985, IEEE.

* cited by examiner

| Fetch (F) | T0 | T3 | T6 | T2 | T7 | T5 | T1 | T4 |
|---|---|---|---|---|---|---|---|---|
| Cache (C) | | T0 | T3 | T6 | T2 | T7 | T5 | T1 |
| Pick (P) | | | T0 | T3 | T6 | T2 | T7 | T5 |
| Decode (D) | | | | T0 | T3 | T6 | T2 | T7 |
| Execute (E) | | | | | T0 | T3 | T6 | T2 |
| Memory (M) | | | | | | T0 | T3 | T6 |
| Bypass (B) | | | | | | | T0 | T3 |
| Writeback (W) | | | | | | | | T0 |
| Execution cycle | 0 | 1 | 2 | 3 | 4 | 5 | 6 | 7 |

FIG. 3

|  | 0 | 1 | 2 | 3 | 4 | 5 | 6 | 7 | 8 | 9 |
|---|---|---|---|---|---|---|---|---|---|---|
| Pick (P) | T0_F | T0_I |  |  |  |  |  |  |  |  |
| Decode (D) |  | T0_F | T0_I |  |  |  |  |  |  |  |
| Execute (E) |  |  | T0_F | T0_I |  |  |  |  |  |  |
| FX1/Memory (M) |  |  |  | T0_F | T0_I |  |  |  |  |  |
| FX2/Bypass (B) |  |  |  |  | T0_F | T0_I |  |  |  |  |
| FX3/Writeback (W) |  |  |  |  |  | T0_F | T0_I |  |  |  |
| FX4 |  |  |  |  |  |  | T0_F |  |  |  |
| FX5 |  |  |  |  |  |  |  | T0_F |  |  |
| Float Bypass (FB) |  |  |  |  |  |  |  |  | T0_F |  |
| Float Writeback (FW) |  |  |  |  |  |  |  |  |  | T0_F |
| Execution cycle |

Exception hazard

FIG. 4

| | 0 | 1 | 2 | 3 | 4 | 5 | 6 | 7 | 8 | 9 | 10 |
|---|---|---|---|---|---|---|---|---|---|---|---|
| Pick (P) | T0_F | T0_I | | | | | | | | | T0_I (refetched) |
| Decode (D) | | T0_F | T0_I | | | | | (flush) | | | |
| Execute (E) | | | T0_F | T0_I | | | | (flush) | | | |
| FX1/Memory (M) | | | | T0_F (exc. predict) | T0_I | | | (flush) | | | |
| FX2/Bypass (B) | | | | | T0_F | T0_I | | (flush) | | | |
| FX3/ Writeback (W) | | | | | | T0_F | T0_I (flush) | (flush) | | | |
| FX4 | | | | | | | T0_F | (flush) | | | |
| FX5 | | | | | | | | T0_F | | | |
| Float Bypass (FB) | | | | | | | | | T0_F (exc. determine) | | |
| Float Writeback (FW) | | | | | | | | | | T0_F | |
| Execution cycle | 0 | 1 | 2 | 3 | 4 | 5 | 6 | 7 | 8 | 9 | 10 |

*FIG. 6*

APPARATUS AND METHOD FOR FLOATING-POINT EXCEPTION PREDICTION AND RECOVERY

BACKGROUND OF THE INVENTION

1. Field of the Invention

This invention relates to processors and, more particularly, to predicting floating-point exceptions within processors.

2. Description of the Related Art

In some pipelined processor embodiments implementing a given instruction set architecture (ISA), different instructions may be configured to execute with different latencies. For example, certain integer instructions may be configured to execute in an integer pipeline of a particular depth (i.e., a particular number of pipeline stages), while certain floating-point instructions may be configured to execute in a floating-point pipeline that is deeper than the integer pipeline. In some such embodiments, an exception condition for a longer-latency instruction may not be detected until late in the pipeline. This may create an exception hazard, in that a shorter-latency instruction issued after the longer-latency instruction may be able to complete execution and to modify architectural state before the exception caused by the longer-latency instruction is detected. Such an exception hazard may not be consistent with a precise exception model.

In some embodiments, this exception hazard may be avoided by preventing the issue of shorter-latency instructions for a number of execution cycles following the issue of a longer-latency instruction, where the number of cycles of delay is sufficient to ensure that the shorter-latency instruction will not modify architectural state until the exception condition for the longer-latency instruction has been detected. However, this solution penalizes every shorter-latency instruction regardless of whether an exception is actually generated for a given longer-latency instruction, and may unacceptably degrade processor performance.

Alternatively, the exception hazard may be avoided in some embodiments by equalizing the depth of the shorter-latency and longer-latency execution pipelines. However, this solution may substantially increase the design complexity of the processor. For example, to avoid stalling instruction issue due to dependencies on previously-issued instructions, result bypassing from each relevant pipeline stage prior to the result writeback stage may be employed. As the number of pipeline stages prior to writeback increases, the number of bypass sources also increases, which in turn requires additional die area to route and multiplex the bypass sources.

SUMMARY

Various embodiments of an apparatus and method for floating point exception prediction and recovery are disclosed. In one embodiment, a processor may include instruction fetch logic configured to issue a first instruction from one of a plurality of threads and to successively issue a second instruction from another one of the plurality of threads. The processor may also include floating-point arithmetic logic configured to execute a floating-point instruction issued by the instruction fetch logic from a given one of the plurality of threads, and further configured to determine whether the floating-point instruction generates an exception, and may further include exception prediction logic configured to predict whether the floating-point instruction will generate the exception, where the prediction occurs before the floating-point arithmetic logic determines whether the floating-point instruction generates the exception.

In one specific implementation of the processor, one or more instructions from the given thread that are subsequent in program order to said floating-point instruction may be flushed from the processor in response to the exception prediction logic predicting that the floating-point instruction will generate the exception. In another specific implementation of the processor, an instruction from a thread other than the given thread may continue to execute while the one or more instructions from the given thread are flushed.

A method is further contemplated that in one embodiment may include the steps of issuing a first instruction from one of a plurality of threads and successively issuing a second instruction from another one of the plurality of threads, determining whether a floating-point instruction issued from a given one of the plurality of threads generates an exception, and predicting whether the floating-point instruction will generate the exception, where the exception prediction occurs before the exception determination.

BRIEF DESCRIPTION OF THE DRAWINGS

FIG. 3 is a pipeline diagram illustrating the flow of instructions through one embodiment of a processor core.

FIG. 4 is a pipeline diagram illustrating the flow of floating-point and integer instructions through one embodiment of a processor core.

FIG. 6 is a pipeline diagram illustrating speculative instruction refetching following exception prediction in one embodiment of a processor core.

Figure 1:
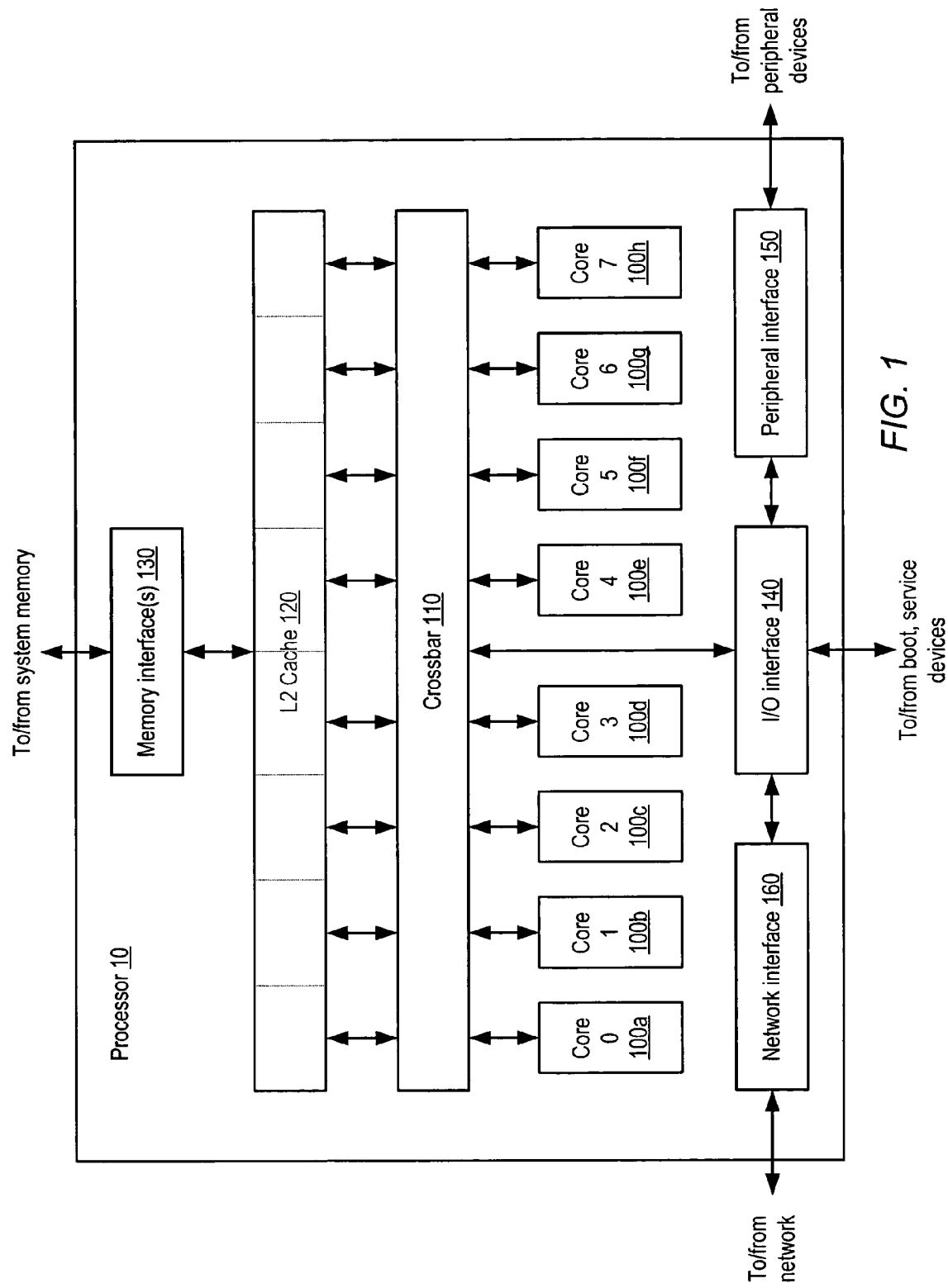
FIG. 1 is a block diagram illustrating one embodiment of a multithreaded processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview of Multithreaded Processor Architecture

A block diagram illustrating one embodiment of a multithreaded processor 10 is shown in FIG. 1. In the illustrated embodiment, processor 10 includes a plurality of processor cores 100a-h, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC® V9 ISA, although in other embodiments it is contemplated that any desired ISA may be employed, such as x86, PowerPC® or MIPS®, for example. In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requesters.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI Express™), although it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

Overview of Fine-Grained Multithreading Processor Core

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

Figure 2:
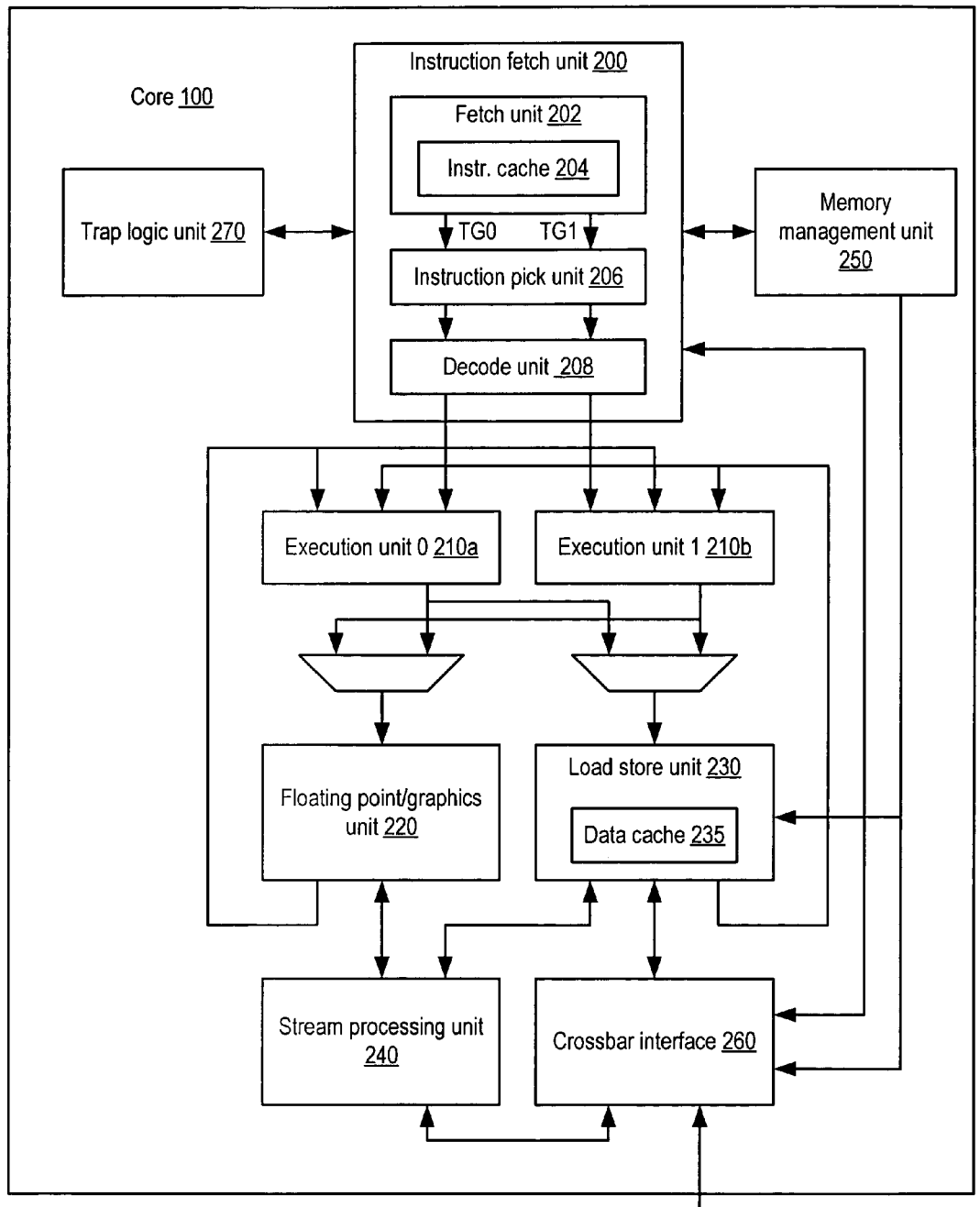
FIG. 2 is a block diagram illustrating one embodiment of a processor core configured to perform fine-grained multithreading.

One embodiment of core 100 configured to perform fine-grained multithreading is illustrated in FIG. 2. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210a-b. (Execution units 210a-b may also be referred to generically as EXUs 210.) Each of execution units 210a-b is coupled to both a floating point/graphics unit (FGU) 220 and a load store unit (LSU) 230. Each of the latter units is also coupled to send data back to each of execution units 210a-b. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 202 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement a respective instruction buffer corresponding to each thread in which several recently-fetched instructions from the corresponding thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1 (for example, if core 100 implements eight threads, each of TG0 and TG1 may include four threads).

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with the IEEE 754 floating-point standard, such as add, subtract, multiply, divide, and certain transcendental functions. Also, in one embodiment FGU 220 may implement partitioned-arithmetic and graphics-oriented instructions defined by a version of the SPARC® Visual Instruction Set (VIS™) architecture, such as VIS™ 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction execution. For example, in one embodiment SPU 240 may be configured to receive operations and operands via control registers accessible via software; in the illustrated embodiment SPU 240 may access such control registers via LSU 230. In another embodiment SPU 240 may receive operations and operands decoded and issued from the instruction stream by IFU 200. In some embodiments, SPU 240 may be configured to freely schedule operations across its various algorithmic subunits independent of other functional unit activity. Additionally, SPU 240 may be configured to generate memory load and store activity. In the illustrated embodiment, SPU 240 may interact directly with crossbar interface 260 for such memory activity, while in other embodiments SPU 240 may coordinate memory activity through LSU 230. In one embodiment, software may poll SPU 240 through one or more control registers to determine result status and to retrieve ready results, for example by accessing additional control registers. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate result retrieval and processing.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requesters. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 206 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program order) complete or update architectural state.

Exemplary Core Pipeline Diagram

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 3.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

Floating-Point Exception Hazards

In some embodiments of core 100, floating-point instructions may be configured to execute in a longer pipeline than other instructions, such as integer instructions. For example, due to the complexity involved in processing floating-point exponents and mantissas, including rounding and normalization, as well as due to the larger size of, e.g., double-precision data values, additional execution pipeline stages may be added to FGU 220 to facilitate implementation.

A pipeline illustrating the flow of integer and floating-point instructions through one embodiment of core 100 is shown in FIG. 4. In the illustrated embodiment, instruction flow is depicted beginning at the Pick stage described above, although it is understood that in various embodiments one or more pipeline stages may precede the Pick stage, such as the Fetch and Cache stages described above. As shown in FIG. 3, integer instructions such as T0_I proceed through the Decode, Execute, Memory, Bypass and Writeback in the illustrated embodiment. By contrast, following the Execute stage, a given floating-point instruction such as T0_F may proceed through five execution stages within FGU 220, designated FX1-FX5, before passing through the Float Bypass stage and the Float Writeback stage. In some embodiments, certain floating-point instructions may execute in a pipeline having different timing than the one shown. For example, in one embodiment divide and/or square-root instructions may execute in a variable number of cycles in a separate execution pipeline. It is contemplated that in other embodiments, a different number of pipeline stages as well as different types of pipeline stages may be used to implement floating-point instructions.

In some embodiments, execution of certain floating-point instructions may result in a floating-point exception being generated. For example, in an embodiment where FGU 220 implements IEEE 754-compliant floating-point arithmetic, certain types of instructions may generate exceptions due to receiving one or more invalid source operands, division by zero, result overflow or underflow, or loss of numerical precision (i.e., inexact result). Additionally, in some embodiments, additional exception-generating scenarios may be defined. For example, in one embodiment an instruction having denormal source operands or a denormal result may cause an exception to allow software to finish processing the instruction. It is contemplated that other types of exceptions may be defined in other embodiments.

Generally speaking, when an exception is generated, a software trap may occur. That is, execution of the thread for which an exception is generated may be interrupted, and execution may be vectored to a software trap handler corresponding to the generated exception. Such a mechanism may enable software to respond to exceptions in a program-defined manner. However, it is contemplated that in some embodiments, whether a generated exception results in a software trap may be enabled or disabled on an individual or group basis. For example, in one embodiment a global floating-point trap enable configurable by software may be provided, such that no traps due to floating-point exceptions are generated if the global enable is deasserted.

Additionally, in one embodiment certain individual exceptions (such as invalid operand, divide-by-zero, overflow, and inexact, for example) may have corresponding software-configurable trap enables, such that traps corresponding to certain types of exceptions may be generated while other traps may be suppressed depending on the state of the individual exception enables.

Depending on the implementation of FGU 220, determining whether a given floating-point instruction generates an exception may occur relatively late in the execution pipeline. For example, exception determination based on a result (e.g., result overflow or underflow) may not be determined until the result is complete following the final floating-point execution stage. In the illustrated embodiment, floating-point exception status for a given instruction may not be definitively known until that instruction is in the Float Bypass stage, although in other embodiments exception status may be known earlier or later.

In some embodiments, when exceptions caused by instruction execution are generated and a corresponding trap occurs, the exception-causing instruction and subsequent instructions (in program order) in any execution pipeline that are from the same thread as the exception-causing instruction may be flushed. Such flushing may facilitate the implementation of precise exceptions, as described above. However, in some embodiments where execution pipelines are of different lengths and exception status is not known until late in the pipeline, an exception hazard may exist in which an instruction subsequent to an exception-causing instruction may modify architectural state before the exception is known. For example, referring to FIG. 4, instructions T0_F and T0_I may issue from thread 0 in successive execution cycles. Integer instruction T0_I may complete and write its result (e.g., to an integer register file) during its Writeback stage in execution cycle 6. However, floating-point instruction T0_F may not generate an exception until its Float Bypass stage in execution cycle 8, two cycles after subsequent instruction T0_I committed its result to architectural state. In some cases, this exception hazard may cause unpredictable or erroneous execution if executing software assumes a precise exception model.

Exception Prediction

Figure 5:
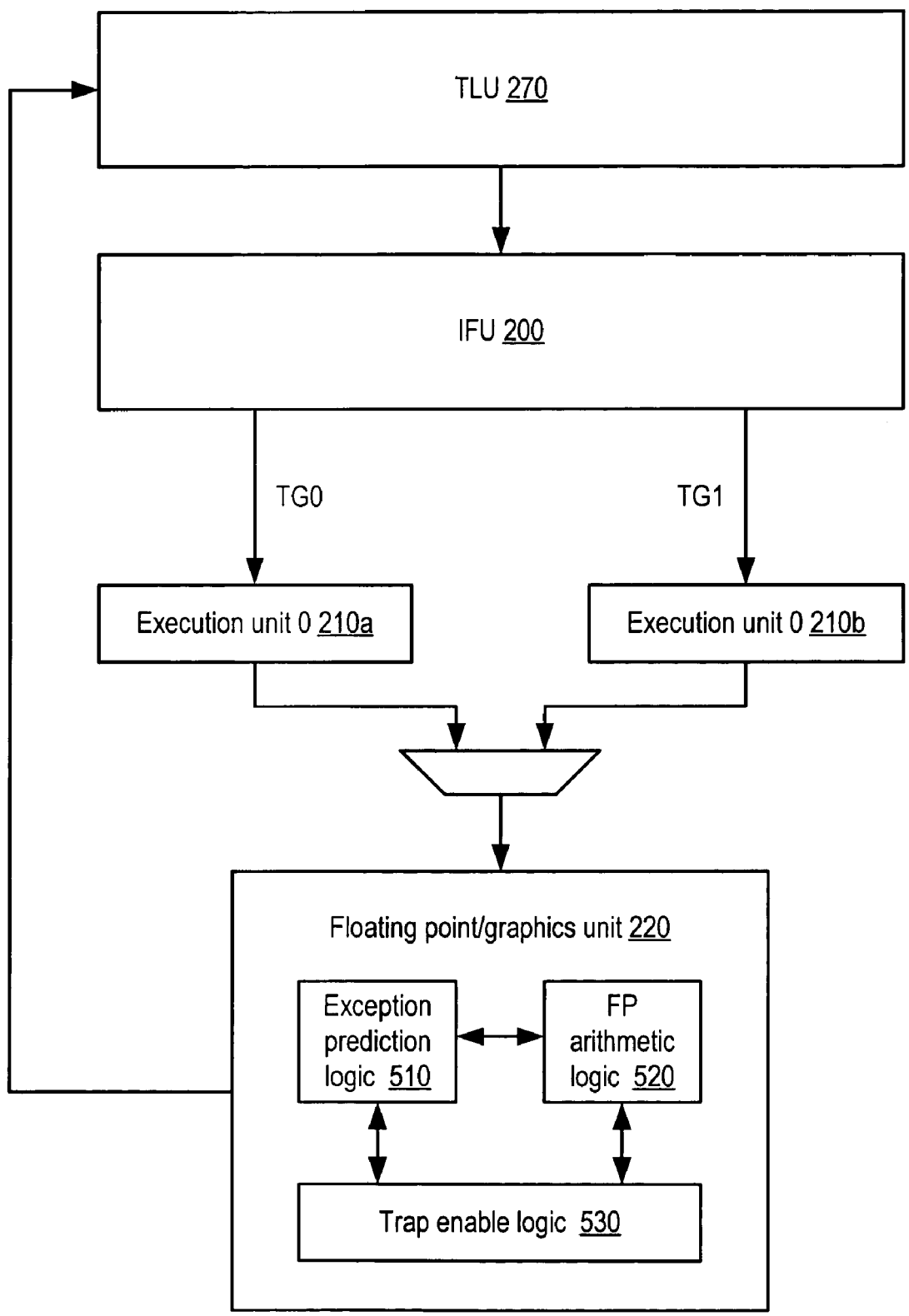
FIG. 5 is a block diagram illustrating one embodiment a processor core configured to predict floating-point exceptions.

In some embodiments, core 100 may be configured to predict whether a given floating-point instruction will cause an exception before that instruction's exception status is determined, and to responsively modify instruction execution behavior. One such embodiment is illustrated in FIG. 5, in which only IFU 200, execution units 210, FGU 220, and TLU 270 are shown; it is understood that in various embodiments core 100 may include other elements such as those previously described. In the illustrated embodiment, FGU 220 includes exception prediction logic 510, floating-point (FP) arithmetic logic 520, and trap enable logic 530, mutually interconnected via a variety of interconnection mechanisms. Additionally, FGU 220 is coupled to convey exception information to TLU 270.

FP arithmetic logic 520 may be configured to execute floating-point instructions. In various embodiments, FP arithmetic logic 520 may include functionality such as adder logic, multiplier logic, normalization logic and/or rounding logic. In some embodiments, FP arithmetic logic 520 may include additional logic to perform division, square root, transcendental and/or other types of operations, such as graphics-oriented operations, for example. In one embodiment, FP arithmetic logic 520 may be configured to implement certain functions, such as add and multiply, in a different pipeline than other functions, such as divide and square root. In the illustrated embodiment, FP arithmetic logic 520 may be configured to determine whether a given floating-point instruction does or does not generate an exception. For example, FP arithmetic logic 520 may determine and report a given floating-point instruction's exception status during the instruction's Float Bypass execution stage.

Exception prediction logic 510 may be configured to predict whether a given floating-point instruction will generate an exception before FP arithmetic logic 520 has determined whether the given instruction generates an exception. In one embodiment, exception prediction logic 510 may be configured to predict whether a given floating-point instruction will generate an exception during the instruction's FX1 execution stage, although in other embodiments exception prediction may occur in a different execution stage. In one embodiment, exception prediction logic 510 may be configured to guarantee that if any floating-point exception can possibly occur as a result of executing a given floating-point instruction, an exception prediction (i.e., a prediction that an exception will occur) will be generated during the appropriate execution stage. However, exception prediction logic 510 may or may not be configured to guarantee that no exception prediction will be generated in the case that no exception is ultimately generated. That is, in such an embodiment exception prediction logic 510 may be configured conservatively, such that all exception-generating cases are correctly predicted, and some non-exception-generating cases may or may not be correctly predicted.

Exception prediction by exception prediction logic 510 and exception generation by FP arithmetic logic 520 may be qualified by trap enable logic 530, in the illustrated embodiment. In various embodiments, trap enable logic 530 may include mask bits or registers configurable by software to selectively enable traps for all or individual exception types as described above. In one embodiment, if software trapping for a given exception is disabled by trap enable logic 530, exception prediction logic 510 may not generate an exception prediction for the disabled exception for any floating-point instruction from any thread. Also, in one such embodiment, FP arithmetic logic 520 may be configured to determine whether a given instruction generates an exception even if software trapping for that exception is disabled. However, FP arithmetic logic 520 may be configured to suppress trapping in this case. In some embodiments, FP arithmetic logic 520 may be configured to indicate exception generation by setting a bit in a status register, so that software may poll the status register to detect exception history even if trapping for that exception is disabled.

In one embodiment exception prediction logic 510 may be configured to generate exception predictions for a given floating-point instruction dependent on one or more operands of the instruction as well as the specific type of the instruction. For example, under the IEEE 754 floating-point arithmetic standard, a floating-point add instruction (FADD) may generate an invalid exception if either operand is a signaling not-a-number data type (SNaN) or if both operands are infinity data types of opposite signs, where the SNaN and infinity data types may be defined in accordance with the IEEE 754 standard. In one embodiment, exception prediction logic 510 may be configured to generate an invalid-exception prediction for an FADD instruction for which either source operand is a SNaN, or for which the source operands are positive infinity and negative infinity. In another embodiment, exception prediction logic 510 may be configured to generate an exception prediction for an FADD instruction for which either source operand is a SNaN or infinity of any sign. It is noted that the latter prediction includes all of the cases of the former prediction as well as some cases that do not generate exceptions (i.e., false-positive cases). In some embodiments, the latter prediction may be simpler to implement than the former, while the former embodiment may produce fewer false-positive exception predictions. Similar tradeoffs between implementation complexity and prediction accuracy may be made for other types of floating-point instructions.

As another example, an IEEE 754-compliant FADD instruction may generate an overflow exception if its result is too large to be represented within the result data format (e.g., single precision or double precision format). Such a case may occur only if the operands have the same sign (i.e., both positive or both negative), if at least one operand has a maximum exponent field, and if neither operand is a NaN (signaling or quiet) or infinity data type. In one embodiment, exception prediction logic 510 may be configured to generate an overflow-exception prediction for an FADD instruction for which the operands satisfy these conditions. In various embodiments, exception prediction logic 510 may be configured to predict other types of exceptions for different floating-point instructions by performing other types of operand analyses, such as by comparing operand exponent fields to each other or to constants, or by referring to other state information such as status or enable bits, for example. It is contemplated that in some embodiments, not every floating-point instruction may be architecturally defined to generate every type of floating-point exception, and some such instructions may not generate any floating-point exceptions. Correspondingly, exception prediction logic 510 may be configured not to predict irrelevant exception cases for an instruction. Also, in one embodiment certain floating-point instructions, such as divide and square root, for example, may be configured to execute in a pipeline separate from other floating-point instructions. In such an embodiment, exception prediction logic 510 may be configured to predict exceptions for instructions in one pipeline, but not the other. For example, exception prediction logic 510 may be configured not to predict divide or square-root-related exceptions.

If exception prediction logic 510 generates an exception prediction for a given floating-point instruction from a given thread, in one embodiment instructions from that given thread that are subsequent in program order to the given floating-point instruction may be flushed from the execution pipeline, regardless of whether they are integer, floating-point, or other types of instructions. In one embodiment, such flushing may include deleting any subsequent instructions that are in the Pick pipeline stage or later, although in other embodiments, subsequent instructions later than a different pipeline stage may be flushed. It is noted that in one embodiment, instructions from a thread other than the given thread may continue executing while instructions from the given thread are flushed. That is, the floating-point exception hazard may exist only between instructions from the same thread.

As noted above, in one embodiment exception prediction logic 510 may be configured to generate an exception prediction for a given floating-point instruction during that instruction's FX1 pipeline stage. In the illustrated embodiment, exception prediction logic 510 may be configured to convey the exception prediction along with a corresponding thread identifier to TLU 270 during the instruction's FX2 pipeline stage. Responsively, TLU 270 may be configured to broadcast an instruction flush for the indicated thread during the instruction's FX3 pipeline stage, which may responsively cause other units (such as IFU 200, EXUs 210 or any other unit of core 100) to void instructions in progress from the indicated thread. Referring to the pipeline diagram illustrated in FIG. 4, the FX3 pipeline stage overlaps with the Writeback stage of the integer execution pipeline. Consequently, a flush broadcast in the FX3 pipeline stage of a given floating-point instruction may be configured to prevent an integer instruction from the indicated thread from writing back its result during a Writeback stage that occurs as early as one cycle after the given floating-point instruction. Thus, for example, if an exception is predicted for instruction T0_F in its FX1 stage (execution cycle 3), the instruction T0_I immediately following T0_F in the pipeline may be flushed when it enters its Writeback stage (execution cycle 6). (In the illustrated embodiment, since exception status may be determined in the Float Bypass stage, FGU 220 may be configured to flush floating-point instruction T0_F before it writes back its result dependent on the actual exception status. In other embodiments, FGU 220 may be configured to flush a given floating-point instruction dependent on the exception prediction.)

In one embodiment, the flush broadcast by TLU 270 in the FX3 pipeline stage may be configured to flush an instruction from the indicated thread in the Writeback stage one cycle later, and all instructions from the indicated thread in the Pick through Writeback stages two cycles later. In other embodiments, it is contemplated that all instructions from the indicated thread may be flushed over the course of more or fewer execution cycles. Further, the timing of the flush relative to generation of the exception prediction may vary in various embodiments, for example according to the depth of the pipeline, implementation considerations, etc.

By flushing subsequent instructions in a given thread on the basis of an exception prediction, thereby preventing the flushed instructions from modifying architectural state, the aforementioned exception hazard may be avoided. In some embodiments, however, mispredicted exceptions (i.e., exception predictions for which no exception was actually generated) may cause instructions to be unnecessarily flushed, which may reduce the performance of the given thread owing to the delay incurred as the unnecessarily flushed instructions are refetched. In one embodiment, IFU 200 may be configured to speculatively refetch one or more instructions subsequent to a given floating-point instruction in a given thread in response to an exception prediction and associated thread flush. If the exception prediction is subsequently confirmed to be correct, such as by FP arithmetic logic 520 during the Float Bypass stage, for example, the refetched instructions may be flushed and the appropriate exception trap handler fetched. If the exception prediction is disconfirmed, the refetched instructions may be allowed to proceed through the pipeline. In some embodiments, such speculative refetching may result in a shorter delay in resuming execution following a misprediction than if the refetch was postponed until the status of a given exception prediction was known.

A pipeline diagram illustrating speculative refetching following exception prediction in one embodiment of core 100 is shown in FIG. 6. In the illustrated embodiment, exception prediction logic 510 may generate an exception prediction for thread 0 floating-point instruction T0_F during pipeline stage FX1. This exception prediction may be propagated to TLU 270 and then broadcast to various other units within core 100, causing the subsequent thread 0 instruction T0_I to be flushed during its Writeback stage in execution cycle 6. If any other instructions from thread 0 are in the execution pipeline, they may be flushed in execution cycle 7 as shown.

Responsive to this flush, in the illustrated embodiment IFU 200 may be configured to immediately begin refetching the first thread 0 instruction (i.e., instruction T0_I) following the floating-point instruction for which the exception prediction was generated. For example, instruction T0_I may enter the Fetch stage (not shown in FIG. 6) in execution cycle 8, immediately following the flush in execution cycle 7.

Later in the execution pipeline, FGU 220 may be configured to determine whether or not an executing floating-point instruction generates an exception. For example, in the illustrated embodiment, FP arithmetic logic 520 may be configured to make this determination in the Float Bypass pipeline stage of instruction T0_F (execution cycle 8). If no exception is generated (i.e., the exception was mispredicted by exception prediction logic 510), instruction T0_F may be allowed to proceed to the Float Writeback stage to write back its results in execution cycle 9, and refetched instruction T0_I may be allowed to proceed through the execution pipeline. In the illustrated embodiment, refetched instruction T0_I is shown entering the Pick stage in execution cycle 10.

Alternatively, if an exception is determined to be generated (i.e., the exception was correctly predicted by exception prediction logic 510), both instruction T0_F and refetched instruction T0_I may be flushed. For example, FGU 220 may be configured to flush instruction T0_F as it enters the Float Writeback stage, preventing it from updating architectural state. Similarly, IFU 200 may be configured to flush refetched instruction T0_I, as well as any subsequent refetched instructions from the same thread. Subsequently, the fetch of the appropriate exception trap handler may be initiated. For example, TLU 270 may direct IFU 200 to begin fetching from the appropriate trap vector.

It is contemplated that in other embodiments, generation of exception predictions, reporting of predictions, flush broadcasting, and speculative refetching of instructions may occur at different pipeline stages than those illustrated, and that latencies between some such events may differ from those illustrated. For example, flush and refetch timing may vary by one or several cycles in various embodiments dependent on pipeline depth, timing concerns, etc. It is also contemplated that in one embodiment, core 100 may provide a means for disabling exception prediction and speculative refetching, such as a control bit or field in a programmable register, for example. In such an embodiment, if exception prediction is disabled, IFU 200 may be configured to stall a given thread after an instruction is issued to FGU 220 from the given thread, such that no further instructions issue from the given thread until the exception status of the issued instruction has been determined. Additionally, it is contemplated that in some embodiments, any of the aforementioned techniques of exception prediction, flushing, and speculative instruction refetching may be performed by functional units of core 100 other than those described above.

Figure 7:
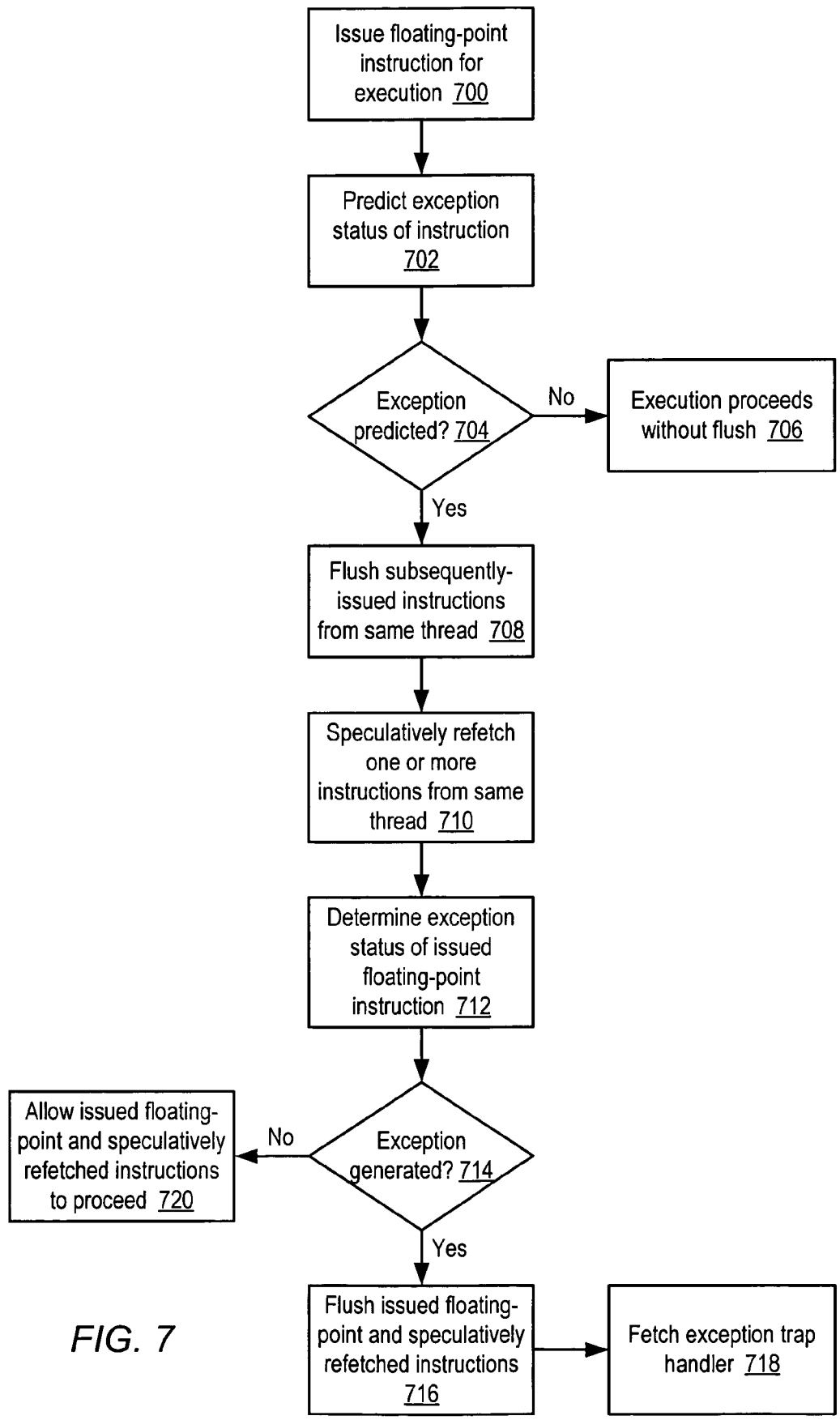
FIG. 7 is a flow diagram illustrating the operation of one embodiment of a method of exception prediction in a fine-grained multithreaded core.

One embodiment of a method of predicting exceptions in a fine-grained multithreaded core such as core 100 is illustrated in FIG. 7. Referring collectively to FIG. 1 through FIG. 7, operation begins in block 700 where a floating-point instruction is issued. For example, IFU 200 may issue a floating-point instruction to be executed by FGU 220. Subsequent to issue of the floating-point instruction, the exception status of the instruction is predicted (block 702). For example, exception prediction logic 510 may be configured to generate predictions of one or more different types of exceptions, dependent on the instruction type and operands as described above. In some embodiments, prediction generation for a given exception may be qualified by whether trapping is enabled for the given exception, as described above.

If no exception prediction is generated, then in the illustrated embodiment, it is guaranteed that no exception will occur for the issued floating-point instruction, and execution of the issued instruction proceeds without a pipeline flush occurring (blocks 704, 706). If an exception prediction is generated, any subsequently issued instructions from the same thread as the issued floating-point instruction are flushed from the execution pipeline (blocks 704, 708). For example, exception prediction logic 510 may convey a generated prediction to TLU 270, to be broadcast to other functional units within core 100.

In response to a flush due to an exception prediction, one or more instructions from the same thread as and subsequent to the issued floating-point are speculatively refetched (block 710), for example by IFU 200. Subsequent to the exception prediction, the exception status of the issued floating-point instruction may be determined (block 712). If the issued instruction does in fact generate the predicted exception, the issued instruction as well as any speculatively refetched instructions are flushed (blocks 714, 716) and the appropriate exception trap handler is fetched (block 718). If the issued instruction does not generate the predicted exception, the issued instruction and any subsequent speculatively refetched instructions are allowed to proceed without flushing (block 720). As noted above, in some embodiments instruction flushing and trap handler fetching in response to exception generation may be qualified by trap enable logic 530.

Exemplary System Embodiment

Figure 8:
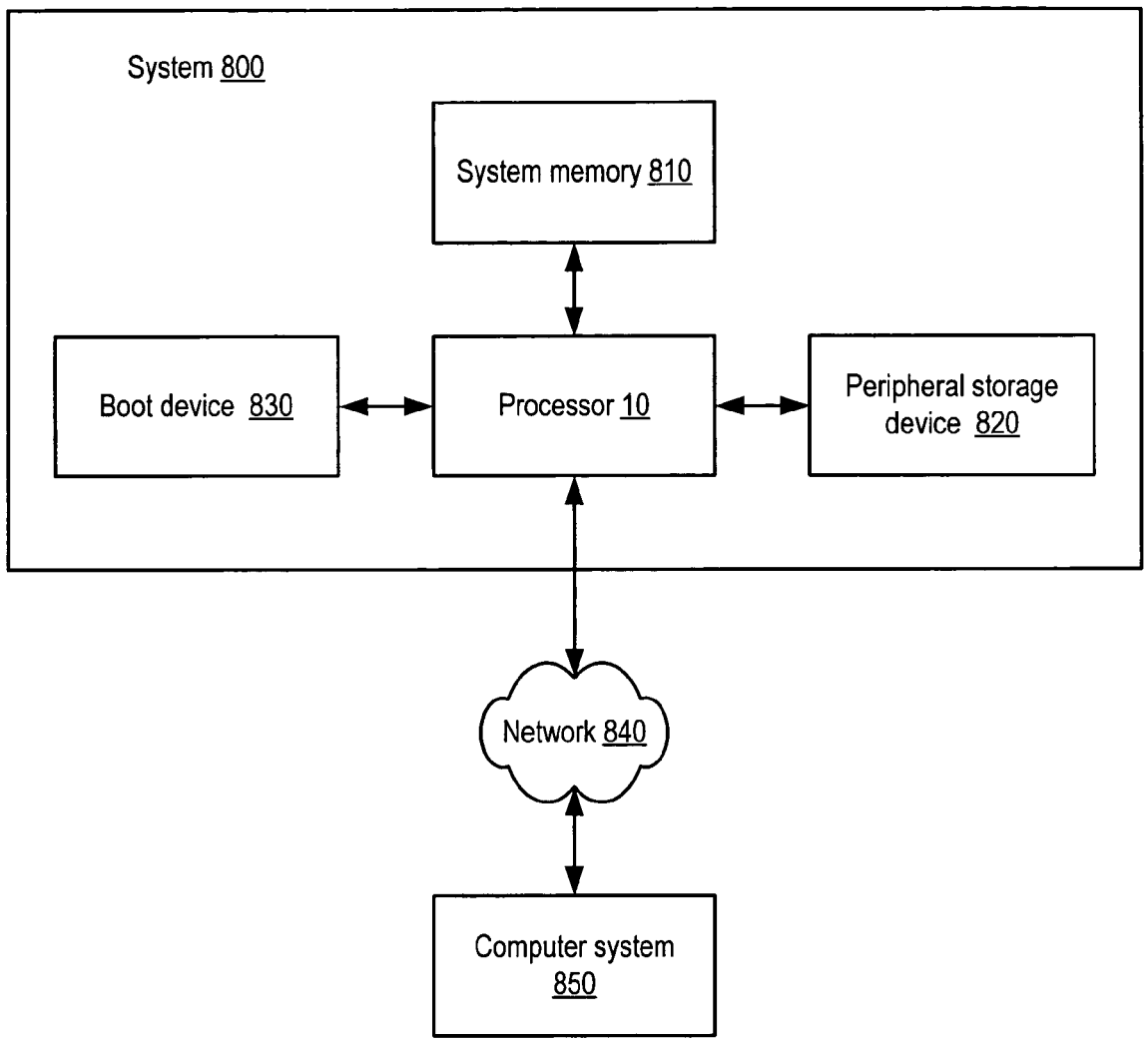
FIG. 8 is a block diagram illustrating one embodiment of a system including a multithreaded processor.

As described above, in some embodiments processor 10 of FIG. 1 may be configured to interface with a number of external devices. One embodiment of a system including processor 10 is illustrated in FIG. 8. In the illustrated embodiment, system 800 includes an instance of processor 10 coupled to a system memory 810, a peripheral storage device 820 and a boot device 830. System 800 is coupled to a network 840, which is in turn coupled to another computer system 850. In some embodiments, system 800 may include more than one instance of the devices shown, such as more than one processor 10, for example. In various embodiments, system 800 may be configured as a rack-mountable server system, a standalone system, or in any other suitable form factor. In some embodiments, system 800 may be configured as a client system rather than a server system.

In various embodiments, system memory 810 may comprise any suitable type of system memory as described above, such as FB-DIMM, DDR/DDR2 SDRAM, or RDRAM®, for example. System memory 810 may include multiple discrete banks of memory controlled by discrete memory interfaces in embodiments of processor 10 configured to provide multiple memory interfaces 130. Also, in some embodiments system memory 810 may include multiple different types of memory.

Peripheral storage device 820, in various embodiments, may include support for magnetic, optical, or solid-state storage media such as hard drives, optical disks, nonvolatile RAM devices, etc. In some embodiments, peripheral storage device 820 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 830 may include a device such as an FPGA or ASIC configured to coordinate initialization and boot of processor 10, such as from a power-on reset state. Additionally, in some embodiments boot device 830 may include a secondary computer system configured to allow access to administrative functions such as debug or test modes of processor 10.

Network 840 may include any suitable devices, media and/or protocol for interconnecting computer systems, such as wired or wireless Ethernet, for example. In various embodiments, network 840 may include local area networks (LANs), wide area networks (WANs), telecommunication networks, or other suitable types of networks. In some embodiments, computer system 850 may be similar to or identical in configuration to illustrated system 800, whereas in other embodiments, computer system 850 may be substantially differently configured. For example, computer system 850 may be a server system, a processor-based client system, a stateless "thin" client system, a mobile device, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor, comprising:
   instruction fetch logic configured to issue a first instruction from one of a plurality of threads and to successively issue a second instruction from another one of said plurality of threads;
   floating-point arithmetic logic configured to execute a floating-point instruction issued by said instruction fetch logic from a given one of said plurality of threads, and further configured to determine whether said floating-point instruction generates an exception; and
   exception prediction logic configured to generate a prediction that said floating-point instruction will generate said exception, wherein said prediction is generated before said floating-point arithmetic logic determines whether said floating-point instruction generates said exception;
   wherein in response to said exception prediction logic generating said prediction that said floating-point instruction will generate said exception, one or more instructions from said given thread that are subsequent in program order to said floating-point instruction are flushed from said processor while an instruction from a thread other than said given thread continues to execute.

2. The processor as recited in claim 1, wherein in response to said instruction flushing, said instruction fetch logic is further configured to speculatively fetch one or more instructions from said given thread that are subsequent to said floating-point instruction in program order.

3. The processor as recited in claim 2, wherein in response to said floating-point arithmetic logic determining that said floating-point instruction does generate said exception, said one or more speculatively fetched instructions are flushed from said processor.

4. The processor as recited in claim 1, wherein said exception is one of an overflow exception, an underflow exception, or an invalid exception, and wherein said overflow exception, said underflow exception, and said invalid exception are defined according to Institute of Electrical and Electronics Engineers (IEEE) 754-1985 Standard for Binary Floating-Point Arithmetic.

5. The processor as recited in claim 1, further comprising enable logic configured to enable or disable said exception, wherein said exception prediction logic is further configured to predict whether said floating-point instruction will generate said exception only if said exception is enabled.

6. The processor as recited in claim 1, wherein said prediction is dependent upon one or more operands of said floating-point instruction.

7. A method, comprising:
   issuing a first instruction from one of a plurality of threads and successively issuing a second instruction from another one of said plurality of threads;
   determining whether a floating-point instruction issued from a given one of said plurality of threads generates an exception;
   generating an indication of a prediction that said floating-point instruction will generate said exception, wherein said generating occurs before said determining; and
   in response to said generating said indication of said prediction that said floating-point instruction will generate said exception, flushing one or more instructions from said given thread that are subsequent in program order to said floating-point instruction from an execution pipeline while an instruction from a thread other than said given thread continues to execute.

8. The method as recited in claim 7, further comprising speculatively fetching one or more instructions from said given thread that are subsequent to said floating-point instruction in program order in response to said flushing.

9. The method as recited in claim 8, further comprising flushing said one or more speculatively fetched instructions in response to determining that said floating-point instruction does generate said exception.

10. The method as recited in claim 7, wherein said exception is one of an overflow exception, an underflow exception, or an invalid exception, and wherein said overflow exception, said underflow exception, and said invalid exception are defined according to Institute of Electrical and Electronics Engineers (IEEE) 754-1985 Standard for Binary Floating-Point Arithmetic.

11. The method as recited in claim 7, further comprising predicting whether said floating-point instruction will generate said exception only if said exception is enabled.

12. The method as recited in claim 7, wherein said predicting is dependent upon one or more operands of said floating-point instruction.

13. A system, comprising:
   a system memory; and
   a processor coupled to said system memory, wherein said processor comprises:
      instruction fetch logic configured to issue a first instruction from one of a plurality of threads and to successively issue a second instruction from another one of said plurality of threads;
      floating-point arithmetic logic configured to execute a floating-point instruction issued by said instruction fetch logic from a given one of said plurality of threads, and further configured to determine whether said floating-point instruction generates an exception; and exception prediction logic configured to generate a prediction that said floating-point instruction will generate said exception, wherein said prediction is generated before said floating-point arithmetic logic determines whether said floating-point instruction generates said exception;

wherein in response to said exception prediction logic generating said prediction that said floating-point instruction will generate said exception, one or more instructions from said given thread that are subsequent in program order to said floating-point instruction are flushed from said processor while an instruction from a thread other than said given thread continues to execute.

14. The system as recited in claim 13, wherein in response to said instruction flushing, said instruction fetch logic is further configured to speculatively fetch one or more instructions from said given thread that are subsequent to said floating-point instruction in program order.

15. The system as recited in claim 14, wherein in response to said floating-point arithmetic logic determining that said floating-point instruction does generate said exception, said one or more speculatively fetched instructions are flushed from said processor.

16. The system as recited in claim 13, wherein said exception is one of an overflow exception, an underflow exception, or an invalid exception, and wherein said overflow exception, said underflow exception, and said invalid exception are defined according to Institute of Electrical and Electronics Engineers (IEEE) 754-1985 Standard for Binary Floating-Point Arithmetic.

17. The system as recited in claim 13, further comprising enable logic configured to enable or disable said exception, wherein said exception prediction logic is further configured to predict whether said floating-point instruction will generate said exception only if said exception is enabled.

18. The system as recited in claim 13, wherein said prediction is dependent upon one or more operands of said floating-point instruction.

19. The processor as recited in claim 1, wherein said exception prediction logic is further configured to correctly generate said prediction in all cases in which said floating-point instruction does generate said exception and to incorrectly generate said prediction in at least one case in which said floating-point instruction does not generate said exception.

20. The processor as recited in claim 1, wherein said floating-point arithmetic logic comprises a plurality of execution pipelines configured to execute different types of floating-point instructions issued by said instruction fetch logic, and wherein said exception prediction logic is configured to generate said prediction for a given one of said floating-point instructions dependent upon which one of said plurality of execution pipelines in which said given floating-point instruction is configured to execute.

21. The method as recited in claim 7, wherein said generating said indication of said prediction that said floating-point instruction will generate said exception comprises correctly generating said prediction in all cases in which said floating-point instruction does generate said exception and incorrectly generating said prediction in at least one case in which said floating-point instruction does not generate said exception.

22. The method as recited in claim 7, further comprising executing different types of floating-point instructions in different ones of plurality of execution pipelines, and wherein said generating said indication of said prediction for a given one of said floating-point instructions is dependent upon which one of said plurality of execution pipelines in which said given floating-point instruction is configured to execute.

23. The system as recited in claim 13, wherein said exception prediction logic is further configured to correctly generate said prediction in all cases in which said floating-point instruction does generate said exception and to incorrectly generate said prediction in at least one case in which said floating-point instruction does not generate said exception.

24. The system as recited in claim 13, wherein said floating-point arithmetic logic comprises a plurality of execution pipelines configured to execute different types of floating-point instructions issued by said instruction fetch logic, and wherein said exception prediction logic is configured to generate said prediction for a given one of said floating-point instructions dependent upon which one of said plurality of execution pipelines in which said given floating-point instruction is configured to execute.

* * * * *